E. S. TEED.
PIPE COUPLING.
APPLICATION FILED MAR. 7, 1918.

1,291,251. Patented Jan. 14, 1919.

INVENTOR.
Earl S. Teed
BY Robert M. Pierson
ATTORNEY

UNITED STATES PATENT OFFICE.

EARL S. TEED, OF AKRON, OHIO, ASSIGNOR TO THE B. F. GOODRICH COMPANY, OF NEW YORK, N. Y., A CORPORATION OF NEW YORK.

PIPE-COUPLING.

1,291,251.

Specification of Letters Patent. Patented Jan. 14, 1919.

Application filed March 7, 1918. Serial No. 220,937.

*To all whom it may concern:*

Be it known that I, EARL S. TEED, a citizen of the United States, residing at Akron, in the county of Summit and State of Ohio, have invented a certain new and useful Pipe-Coupling, of which the following is a specification.

This invention relates to means for detachably connecting lengths of flexible-walled piping such as the canvas pipes used for mine ventilation. My object is to provide a form of coupling which will enable the joints to be readily made and disconnected, will be free from liability to accidental separation, will not appreciably obstruct the free flow of air or other fluid through the pipe, and will be light, strong and relatively cheap to manufacture.

Of the accompanying drawings.

Figure 1:
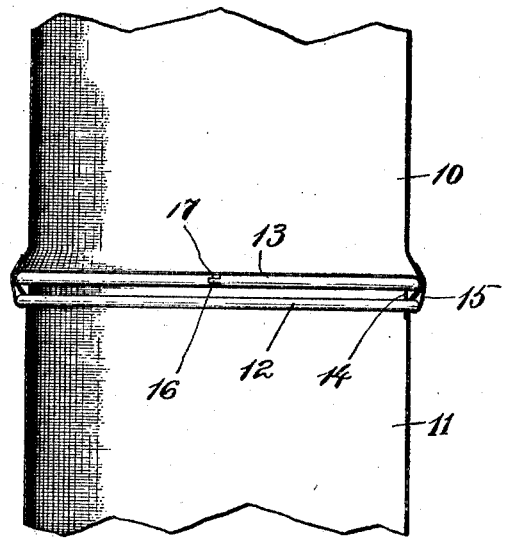
Figure 1 is a longitudinal section of a pipe coupling embodying my invention.

In the drawings, 10, 11 are two pipe sections to be connected, composed of canvas or other flexible material, and 12, 13 are two circular hoops or rings of the same normal diameter, composed of metal such as steel, of circular section, occupying sheaths 14, 15 in the ends of the pipe sections, said sheaths being formed by doubling the canvas back on itself and sewing the plies together. These doubled-back portions are respectively on the outer side of the body of section 10 and the inner side of the body of section 11, so that their edges will not interfere with the pulling-together of the rings. The ring 12 in the outer or overlying pipe end (that of section 10) is solid or continuous. The ring 13 in the inner or underlying pipe end (that of section 11) is split, preferably at one point only so that its ends will spring together, and its abutting ends are provided respectively with a tongue 16 and groove 17 forming a mortise joint in the plane of the ring. The split ring, especially, should fit somewhat loosely in its sheath 14, so that its ends may be manipulated. An external mark may be placed on the pipe end containing the split ring, to identify that end.

Figure 2:
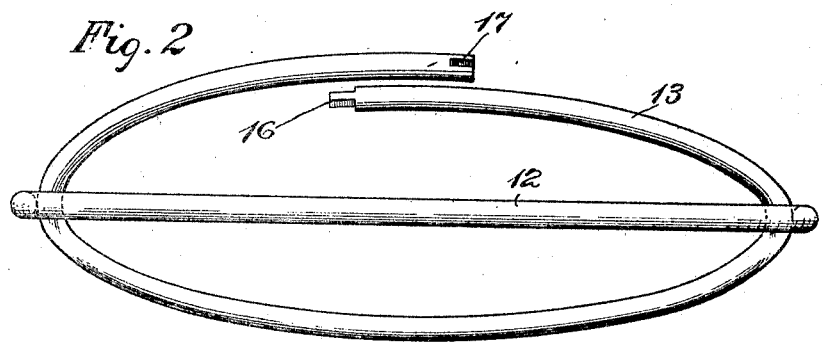
Fig. 2 is an elevation showing the mode of passing the split ring through the solid ring, the pipe sections being omitted in this view.

To connect the pipe sections, the split ring 13 in the end of section 11 is collapsed so as to make it smaller than the solid ring 12 as indicated in Fig. 2, and the end of section 11 is telescoped within the end of section 10, the split ring passing through the continuous ring in a tilted position, and preferably solid side first, so that its ends are accessible for manipulation. Then, by grasping the ends of said split ring through the interposed canvas walls and gathering some slack in said walls over the joint, the ends may be pulled apart and moved into alinement until they interlock at the mortise joint 16, 17. The pipe sections are then pulled taut and the rings brought parallel until said rings approach somewhat closer than shown in Fig. 1. Being of the same diameter, the rings cannot be pulled past each other, and the coupling therefore holds securely until it is desired to separate the pipe sections for renewal of a section or for any other purpose. The disconnection may then be easily effected by reversing the order of the steps above described.

I claim:

1. In a pipe coupling, the combination of flexible-walled pipe-sections having their ends telescoped, and hoops or rings of substantially equal diameter in said ends, one of the rings being transversely split and collapsible, the ends thereof being adapted to spring together and having complemental inter-fitting joint-forming members held together by the spring of said ring.

2. In a pipe coupling, the combination of telescoped, flexible, canvas pipe sections having ring sheaths at their ends, and rings of substantially equal diameter occupying the respective sheaths, one of said rings being continuous and the other transversely split and collapsible, its ends being adapted to spring together.

3. In a pipe coupling, the combination of telescoped flexible pipe-sections, a circular ring in the end of the outer section, and a collapsible transversely-split circular ring of substantially equal diameter in the end of the inner section, said split ring having its joint mortised in the plane of the ring, the members of the mortise joint being held together by the spring of the ring.

In testimony whereof I have hereunto set my hand this second day of March, 1918.

EARL S. TEED.

Copies of this patent may be obtained for five cents each, by addressing the "Commissioner of Patents. Washington, D. C."